(12) United States Patent
Mityagin et al.

(10) Patent No.: US 7,657,029 B2
(45) Date of Patent: Feb. 2, 2010

(54) SYSTEMS AND METHODS FOR GENERATING RANDOM ADDITION CHAINS

(75) Inventors: Anton Mityagin, La Jolla, CA (US);
Ilya Mironov, Mountain View, CA (US);
Yaacov Nissim Kobliner, Beer Sheva (IL)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 11/069,112

(22) Filed: Mar. 1, 2005

(65) Prior Publication Data
US 2006/0198516 A1 Sep. 7, 2006

(51) Int. Cl.
*H04L 9/30* (2006.01)
(52) U.S. Cl. .................................................. 380/30
(58) Field of Classification Search .................. 380/30, 380/37, 44, 46; 708/277, 250, 851
See application file for complete search history.

(56) References Cited

U.S. PATENT DOCUMENTS 5,987,131 A * 11/1999 Clapp .......................... 713/171
5,999,627 A * 12/1999 Lee et al. ...................... 380/30
6,091,819 A *  7/2000 Venkatesan et al. ........... 380/28

OTHER PUBLICATIONS

Schnorr, C.P., "Efficient Identification and Signatures for Smart Cards," Crypto'89, 1989, pp. 239-252.
deRooij, P., "On the Security of the Schnorr Scheme Using Preprocessing," Eurocrypt'91, 1991, pp. 71-80.
Schnorr, C.P., "Efficient Signature Generation by Smart Cards," Universitat Frankfurt, Mar. 1991, pp. 1-22.
de Rooij, Peter, "On Schnorr's Preprocessing for Digital Signature Schemes," J. Cryptology, v. 10(1), 1997, pp. 1-16.
Boyko, Victor, et al., "Speeding up Discrete Log and Factoring Based Schemes via Precomputations," EuroCrypt '98, LNCS 1403, 1998, pp. 221-235.
Aiello, William, et al., "Design of Practical and Provably Good Random Number Generators," J. Algorithms, v. 29(2), 1998, pp. 358-389.
Brickell, Ernest F., et al., "Fast Exponentiation with Precomputation: Algorithms and Lower Bounds," Nov. 30, 1995, pp. 1-21.
de Rooij, Peter, "Efficient Exponentiation using Precomputation and Vector Addition Chains," Eurocrypt'94, 1994, pp. 389-399.
Lim, Chae Hoon, et al., "More Flexible Exponentiation with Precomputation," Crypto'94, 1994, pp. 95-107.
von zur Gathen, Joachim, et al., "Exponentiation in Finite Fields: Theory and Practice Abstract," AAECC-12, LNCS 1255, 1997, pp. 88-133.
Knuth, Donald E., "The Art of Computer Programming (TAOCP)," *Seminumerical Algorithms*, 3rd Edition, Addison-Wesley, 1997.
Thurber, Edward G., "Efficient Generation of Minimal Length Addition Chains," *SIAM Journal on Computing*, vol. 28, No. 4, 1999, 1 page Abstract.
Coarfa, Cristian, et al., "Performance Analysis of TLS Web Servers," NDSS'02, 2002, pp. 183-194.

* cited by examiner

*Primary Examiner*—Eleni A Shiferaw
(74) *Attorney, Agent, or Firm*—Woodcock Washburn LLP

(57) ABSTRACT

An addition chain is first generated, and then an integer x is derived from it. Doubling and star steps may be implemented in the addition chain. This approach eliminates the computationally expensive step of generating the addition chain from an exponent, and therefore can greatly reduce the computation time of the modular exponentiation.

14 Claims, 3 Drawing Sheets

US 7,657,029 B2

SYSTEMS AND METHODS FOR GENERATING RANDOM ADDITION CHAINS

FIELD OF THE INVENTION

The present invention relates generally to the field of exponentiation, and, more particularly, to representing exponents as addition chains.

BACKGROUND OF THE INVENTION

Exponentiation (or, in the groups employing additive notation, multiplication) is one of the most time-consuming operations of many public-key cryptographic protocols. One study of the SSL/TLS protocol estimated the performance hit of the RSA (Rivest Shamir Adleman) exponentiation to be between 20% and 60% of the total server running time.

Modular exponentiation (computing $g^x$ mod N) is very common and by far the most expensive operation of many cryptographic protocols. Traditional methods for fast exponentiation transform the binary exponent either implicitly or explicitly into an addition chain, which is used directly to perform exponentiation. However, it is computationally infeasible to generate optimal addition chains for large exponents. The traditional method of raising g to a random power x is to first generate random x and then apply the best available method for computing $g^x$. However, this approach uses the inherently suboptimal step of generating the addition chain from an exponent.

There are many approaches to speeding up exponentiation in finite groups. The most general one is to treat g and x as inputs to the exponentiation algorithm, computing $g^x$, and optimizing the algorithm's average (or worst case) running time. A different approach, called the fixed-base method, is applicable when g is fixed and thus the algorithm can take advantage of some precomputation that would be amortized over many invocations of the exponentiation algorithm. Yet another approach is to draw the exponent from a strategically chosen set that minimizes the expected running time of the exponentiation algorithm.

In view of the foregoing, there is a need for systems and methods that overcome such deficiencies. For example, it would be desirable to reduce the running time of exponentiation without increasing any memory requirement.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

An embodiment of the present invention is directed to computing modular exponentiation to reduce the running time of exponentiation.

According to aspects of the invention, an integer x is generated simultaneously with the method of computing $g^x$ (as an addition chain). According to further aspects of the invention, an addition chain is first generated, and then x is derived from it. This approach eliminates the computationally inefficient step of generating the addition chain from an exponent, and therefore can greatly reduce the computation time of the modular exponentiation.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Addition chains are a direct and natural encoding of efficient exponentiation methods. Informally, an addition chain is a sequence of steps performed by any exponentiation algorithm that uses group multiplication as an atomic operation. The vast body of scientific literature written on fast exponentiation can be viewed as a collection of efficient transformations of a binary exponent into an addition chain. These transformations are by necessity approximations, because finding optimal addition chains is currently computationally infeasible for exponents exceeding 25 bits. An embodiment of the present invention avoids this inefficient step by generating, storing, and transmitting exponents throughout the protocol as addition chains rather than in the binary form. This is preferable to the previously known methods in a scenario where the base is not reused but the choice of the exponent is discretionary. Such scenarios include the Diffie-Hellman key exchange protocol and the RSA signing algorithm.

Formally, an addition chain for an integer x of length l is a sequence of integers $$1=a_0<a_1<\ldots<a_l=x,$$

where for any $0<i\leq l$ there exist $0\leq j$, $k<i$ so that $a_i=a_j+a_k$. In other words, an addition chain is a path from 1 to x where each step is a sum of two previously obtained numbers. Addition chains modulo arbitrary N may be similarly defined. For example, an addition chain of length 6 for 23 is (1, 2, 3, 5, 10, 20, 23).

Figure 1:
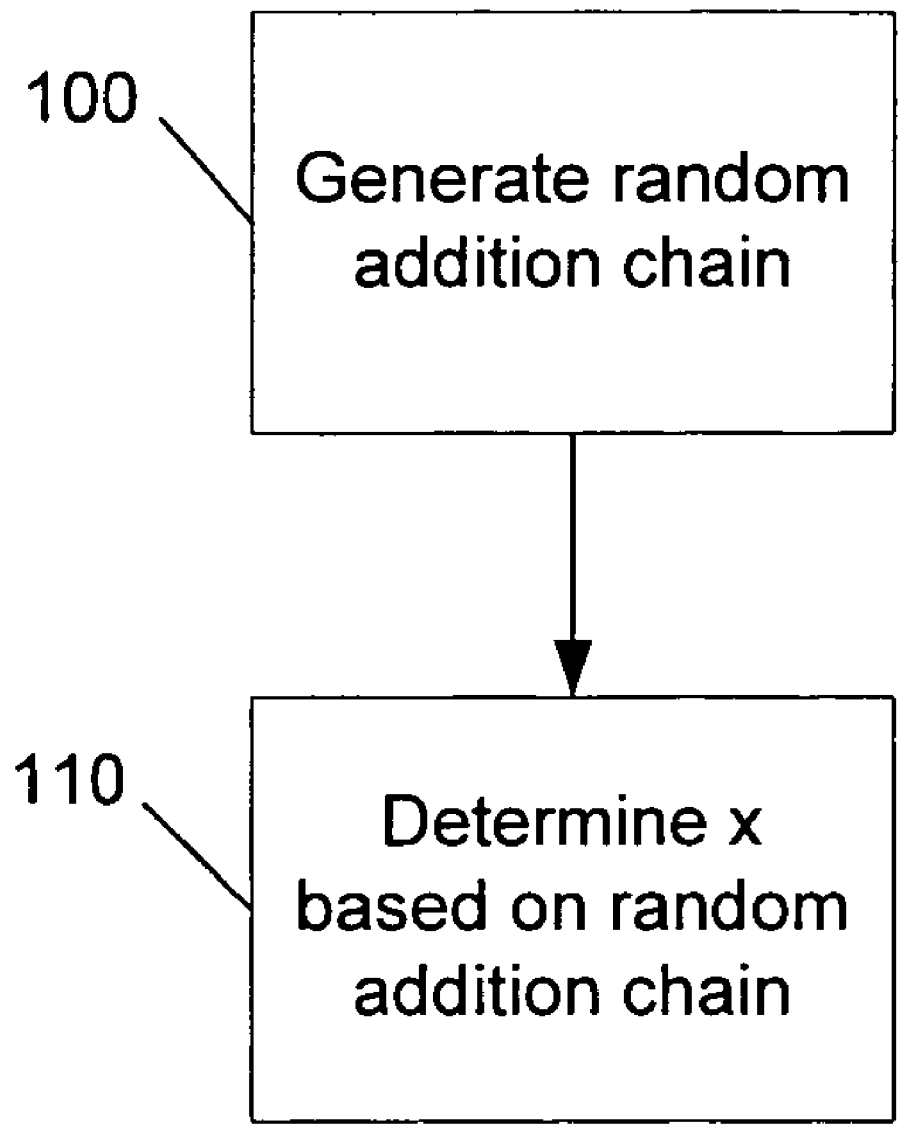
FIG. 1 is a flow diagram of an exemplary method of exponentiation in accordance with the present invention.

FIG. 1 is a flow diagram of an exemplary method of exponentiation in accordance with the present invention. At step 100, a random addition chain is generated, using for example, the exemplary technique described with respect to FIG. 2. The integer x may then derived from the addition chain, at step 110. It is noted that the correspondence between x and addition chains is one-to-many. Given x, there exist many addition chains, some of which are more desirable than others, but given an addition chain, there is only one corresponding x.

There is a connection between modular addition chains and exponentiation in cyclical groups. Consider a technique that uses multiplication or squaring as an atomic operation and computes $g^x$ on input g and x. The sequence of group elements computed by the algorithm is $g^1 = g^{a_0}, g^{a_1}, \ldots, g^{a_l} = g^x$. The sequence $1 = a_0, a_1, \ldots, a_l = x$ is an addition chain modulo the order of the group. Vice versa, given an addition chain $1 = a_0, a_1, \ldots, a_l = x$ and g, $g^{a_1}, \ldots, g^{a_l} = g^x$ may be computed from left to right, computing $g^{a_i}$ for some $a_i = a_j + a_k$ as a product of previously computed $g^{a_j} * g^{a_k} = g^{a_i}$. Notice that the number of multiplication steps performed while computing $g^x$ equals the length of the addition chain.

It is convenient to define the following terminology. The ith step is a doubling if $a_i = a_{i-1} + a_{i-1}$. The ith step is a star step if $a_i = a_{i-1} + a_j$ for some $j < i$. An addition chain consisting only of star steps is called a star chain (also known as a Brauer chain). Notice that a doubling is a star step but not vice versa.

It is often the case that squaring and multiplication have different running times (usually squaring is faster than multiplication, except for some elliptic curves). To account for the difference, it is desirable to track separately the doubling and non-doubling steps of the addition chain.

Addition chains are most compactly represented by noting the sequence of additions, e.g., for the ith step, where $a_i = a_j + a_k$, its encoding will be pair (j, k). Given such representation, the last element of the chain may be determined by performing all additions in the order in which they are written starting with $a_0 = 1$. The first two elements of the addition chain, which are always $a_0 = 1$ and $a_1 = 2$, can be omitted.

Star addition chains allow further compression. Because one of the two summands is always fixed in a star step, it suffices to store only the other summand.

Another saving in the encoding size can be achieved by noticing that most of the steps in a short addition chain are doublings, and the description of an addition chain may be compressed by introducing a special symbol d for doublings.

For example, the same addition chain as set forth above (of length 6 for 23) can be encoded as (0, 1, d, d, 2). It corresponds to $a_0 = 1$, $a_1 = 2$ (omitted from the compressed encoding), $a_2 = a_1 + a_0 = 3$, $a_3 = a_2 + a_1 = 5$, $a_4 = 2a_3 = 10$, $a_5 = 2a_4 = 20$, $a_6 = a_5 + a_2 = 23$.

Regarding the generation of addition chains, there are many conventional techniques that translate a binary representation into an addition chain. Because finding a short addition chain may be a very computationally-intensive operation, it may be desirable to make a one-time investment into finding an efficient addition chain for a long-lived exponent. For example, a root key of a large certificate authority or an RSA signing key used by a busy SSL/TLS server submits well to such an optimization.

If the exponent's choice is flexible, the addition chain representation may be used as a native format for the exponent, i.e., generating an addition chain first and computing the exponent in the binary from the addition chain, as noted above with respect to FIG. 1, for example. Depending on the security requirements, it may be desirable to target computational or statistical indistinguishability of the resulting exponents from the random ones, or the hardness of the discrete logarithm problem when the adversary is aware of the method being used to generate exponents. In most scenarios, the set of exponents is desirably Hamming weight-balanced and avoids non-negligible correlations between small groups of bits.

Figure 2:
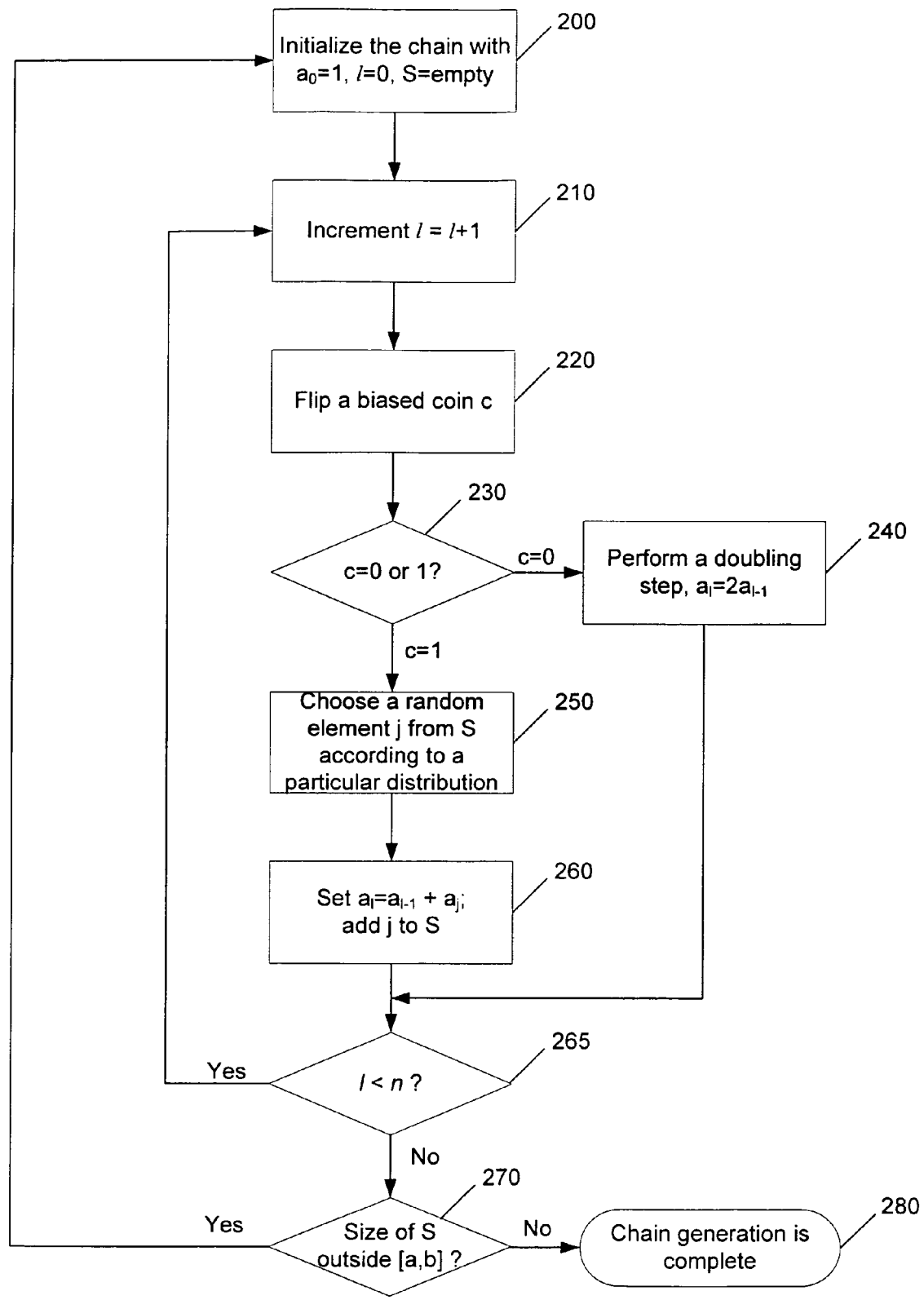
FIG. 2 is a flow diagram of an exemplary technique that may be used for generating a random addition chain in accordance with the present invention.

FIG. 2 is a flow diagram of an exemplary technique that may be used for generating a random addition chain. The technique uses constants n,a,b, $\{p_i\}_{i=1}^{n}$, $\{q_i^{(j)}\}_{i=1,j=1}^{j,n}$ which should be chosen to fit the requirements of a particular application. n is the length of the chain, a is the lower and b is the upper bound on the number of star steps. $p_i$ is the probability that the ith step is a star step, and $q_i^{(j)}$ is the probability that (conditional on the jth step being a star step) $a_i = a_{i-1} + a_k$, where k is the index of the ith star step.

At step 200, the chain is initialized with $a_0 = 1$, set $l=0$, and $S = \{0\}$. Steps 210-265 are repeated for $l=1 \ldots n+1$. At step 210, increment $l \leftarrow l+1$. A biased coin $c \leftarrow_R \{0, 1\}$ that takes value 1 with probability $p_l$ is flipped, at step 220. At step 230, it is determined whether the coin flip resulted in a 0 or 1. If $c=0$, set $a_l = 2a_{l-1}$ (a doubling step) at step 240, and continue at step 265. Thus, the chain may be augmented by flipping a biased coin. If the coin comes up tails, the new element is twice the previous element (a doubling step). Otherwise, it is a star step generated as follows: the new element is the sum of the previous element and an element randomly chosen according to a particular distribution from among results of previous star steps. More particularly, if $c=1$, then at step 250, a random element $j \in S \setminus \{j-1\}$ is chosen according to the distribution that assigns probability $q_i^{(l)}$ to the ith element of $S \setminus \{j-1\}$. At step 260, set $a_l = a_{l-1} + a_j$ and add j to $S = S \cup \{j\}$.

At step 265, if $l < n$, then l is incremented with processing continuing at step 210. If $l > n$, then processing continues at step 270.

At step 270, it is determined whether the size of the set S is outside interval [a, b]. If so, processing continues at step 200; otherwise, chain generation is complete at step 280.

This technique generates an addition chain with |S| star steps (the number between a and b) and n−|S| doublings. Any star step uses at least one odd element.

Based on numeric experiments, the following parameters for generating 160-bit long exponents may be desirable:

Set a=20, b=30, and n=185;
Let $q_0^{(l)} = \ldots = q_l^{(l)}$
Assign $$p_i = \alpha \frac{i}{n} + \beta \left(\frac{i}{n}\right)^2,$$

where $\alpha$ and $\beta$ chosen to make $$p_n = \frac{1}{2} \geq p_{n-1} \geq \ldots \geq p_0 \geq 0 \text{ and } \sum_{i=1}^{n} p_i = \frac{1+b}{2}.$$

A special case involves an RSA exponent. Suppose the owner of the RSA secret (prime factors of N=pq) wants to compute $M^e$ mod N. A conventional technique to speed up the computation is to evaluate $M_p = M^{e \bmod (p-1)}$ mod p and $M_q = M^{e \bmod (q-1)}$ mod q, and then combine $M_p$ and $M_q$ using the Chinese Remainder Theorem (CRT). Notice that the exponents used in the computation are not the original e.

In order to optimize these exponentiations, choose p and q so that p−1 and q−1 have only small common divisors, for example, d=2 or 6. Let d=gcd(p−1,q−1). One example when d is guaranteed to be small is when p and q are Sophie Germain primes of the same length. Generate $e_p < p-1$ and $e_q < q-1$ together with the corresponding additions chains so that $e_p = e_q$ mod d. Using the Chinese Remainder Theorem, compute e so that $e=e_p$ mod p−1 and $e=e_q$ mod q−1. Then the addition chain for $e_p$ can be used to compute $M_p = M^{e \bmod (p-1)} = M^{e_p}$ mod p and the addition chain for $e_q$ can be used to compute $M_q = M^{e \bmod (q-1)} = M^{e_q}$ mod q.

In some scenarios it may be desirable to perform arithmetic operations on addition chains. Multiplication on addition chains may be performed by concatenating two chains and renumbering the second chain. Addition is similar except that the sum of two star chains in general is not a star chain.

Thus, using the exemplary techniques set forth herein, the running time of exponentiation in some common scenarios may be reduced up to about 15 percent without increasing the memory requirement.

Example Computing Environment

Figure 3:
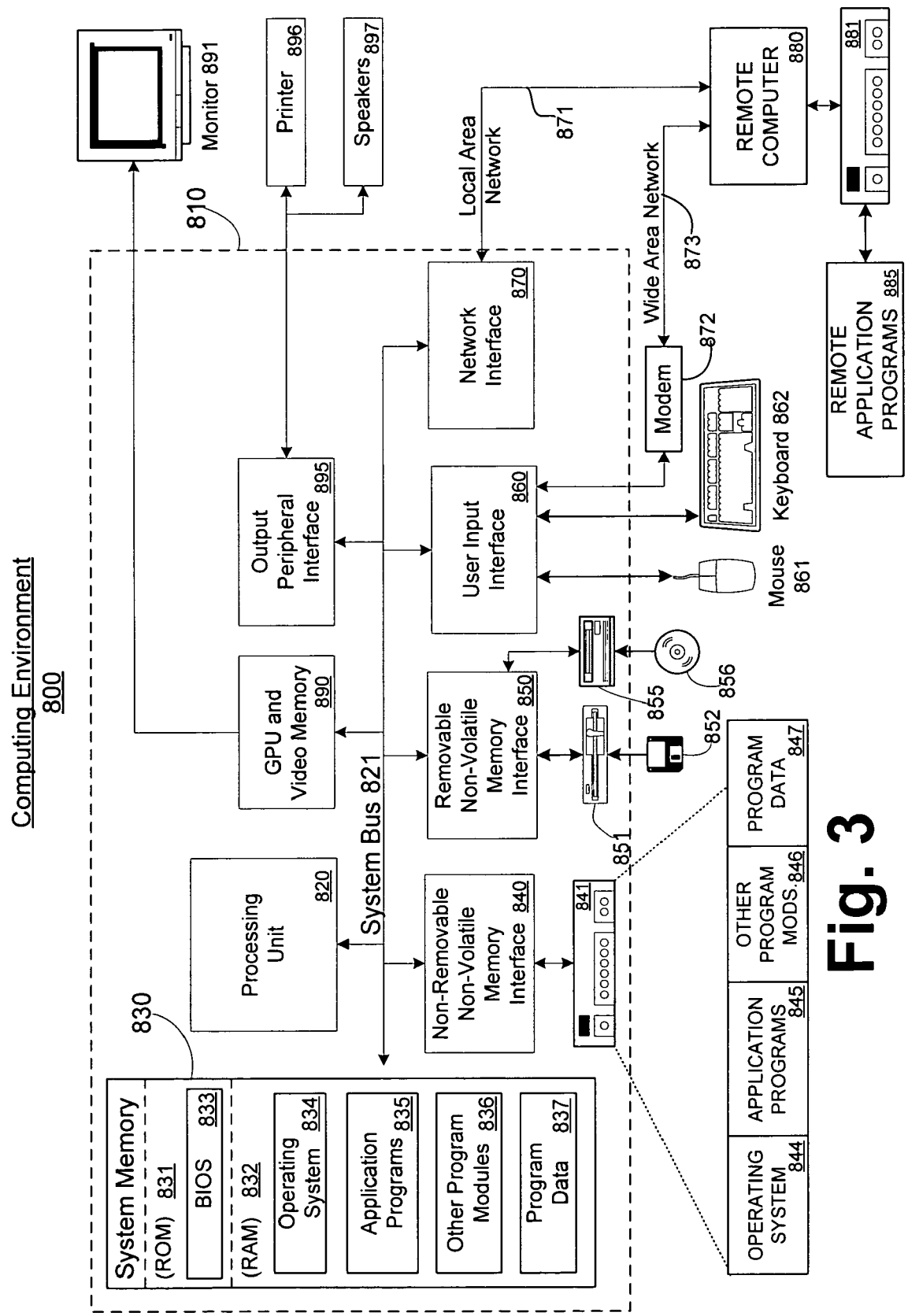
FIG. 3 is a block diagram showing an example computing environment in which aspects of the invention may be implemented.

FIG. 3 illustrates an example of a suitable computing system environment 800 in which the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 3, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or non-volatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 3 illustrates operating system 834, application programs 835, other program modules 836, and program data 837.

The computer 810 may also include other removable/non-removable, volatile/non-volatile computer storage media. By way of example only, FIG. 3 illustrates a hard disk drive 840 that reads from or writes to non-removable, non-volatile magnetic media, a magnetic disk drive 851 that reads from or writes to a removable, non-volatile magnetic disk 852, and an optical disk drive 855 that reads from or writes to a removable, non-volatile optical disk 856, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media provide storage of computer readable instructions, data structures, program modules and other data for the computer 810. In FIG. 3, for example, hard disk drive 841 is illustrated as storing operating system 844, application programs 845, other program modules 846, and program data 847. Note that these components can either be the same as or different from operating system 834, application programs 835, other program modules 836, and program data 837. Operating system

844, application programs 845, other program modules 846, and program data 847 are given different numbers here to illustrate that, at a minimum, they are different copies.

A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB).

A monitor 891 or other type of display device is also connected to the system bus 821 via an interface, such as a video interface, which may comprise a graphics processing unit (GPU) and video memory 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 3. The logical connections depicted include a LAN 871 and a WAN 873, but may also include other networks. Such networking environments are commonplace in offices, enterprise-wide computer networks, intranets and the internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 3 illustrates remote application programs 885 as residing on memory device 881. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method comprising:
   receiving, by a processor of a computing system, input parameters that are used by the computing system and the processor to generate an exponent for a cryptographic process, wherein said generating said exponent comprises;
   generating an addition chain based on the input parameters by:
   (a) initiating a chain;
   (b) flipping a biased coin;
   (c) performing a doubling step or a star step on the chain based on the biased coin flip;
   (d) when said star step is performed, choosing a random element and adding the random element to a set of random elements;
   (e) determining whether the size of the set of random elements is outside a bounded interval; and
   repeating steps (b)-(d) a number of times based on a length of the chain, wherein when the size of the set of random elements is outside the bounded interval, determining that generation of the chain is complete;
   deriving said exponent from the generated addition chain; and
   storing the exponent.

2. The method of claim 1, wherein the addition chain is a random addition chain.

3. The method of claim 1, wherein the addition chain comprises said doubling step.

4. The method of claim 1, wherein the addition chain comprises said star step.

5. The method of claim 1, wherein the exponent is derived in binary form.

6. The method of claim 1, wherein the exponent is an asymmetric key encryption exponent.

7. The method of claim 1, further comprising compressing the addition chain.

8. The method of claim 7, wherein said compressing comprises implementing at least one of said doubling step and said star step.

9. The method of claim 1, further comprising using the addition chain in a cryptographic process.

10. A method comprising:
receiving, by a computing system, input parameters that are used by a processing system for generating an addition chain that is then used by a processor of the computing system to derive an exponent from said generated addition chain for a cryptographic process;
generating, by said processor of the computing system, the addition chain based on the input parameters, wherein said generating the addition chain comprises:
(a) initializing a chain;
(b) flipping a biased coin;
(c) performing a doubling step or a star step on the chain based on the biased coin flip;
(d) when said star step is performed, then choosing a random element and adding the random element to a set of random elements;
(e) determining whether the size of the set of random elements is outside a bounded interval; and
repeating steps (b)-(d) a number of times based on a length of the chain, wherein when the size of the set of random elements is outside the bounded interval, determining that generation of the chain is complete.

11. A computer readable storage medium having computer executable instructions stored thereon which are executed by a computer for performing steps of:
receiving input parameters for generating an exponent for a cryptographic process;
generating an addition chain based on the input parameters by;
(a) initiating a chain;
(b) flipping a biased coin;
(c) performing a doubling step or a star step on the chain based on the biased coin flip;
(d) when said star step is performed, choosing a random element and adding the random element to a set of random elements;
(e) determining whether the size of the set of random elements is outside a bounded interval; and
repeating steps (b)-(d) a number of times based on a length of the chain, wherein when the size of the set of random elements is outside the bounded interval, determining that generation of the chain is complete;
deriving an the exponent from the generated addition chain; and
storing the exponent.

12. The computer readable storage medium of claim 11, wherein the addition chain comprises at least one of said doubling step and said star step.

13. The computer readable storage medium of claim 11, further comprising computer executable instructions that compress the addition chain.

14. The computer readable storage medium of claim 11, further comprising computer executable instructions that use the addition chain in a cryptographic protocol.

* * * * *